United States Patent
Higashi

(10) Patent No.: US 10,142,413 B2
(45) Date of Patent: Nov. 27, 2018

(54) INFORMATION PROCESSING APPARATUS, INFORMATION PROCESSING SYSTEM, AND COMMUNICATION CONTROL METHOD

(71) Applicant: Haruomi Higashi, Kanagawa (JP)

(72) Inventor: Haruomi Higashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 179 days.

(21) Appl. No.: 14/684,702

(22) Filed: Apr. 13, 2015

(65) Prior Publication Data

US 2015/0304416 A1    Oct. 22, 2015

(30) Foreign Application Priority Data

Apr. 17, 2014 (JP) ................... 2014-085657

(51) Int. Cl.
*H04L 29/08* (2006.01)

(52) U.S. Cl.
CPC .......... *H04L 67/1095* (2013.01); *H04L 67/06* (2013.01); *H04L 67/322* (2013.01)

(58) Field of Classification Search
CPC ................................................ H04L 67/1095
USPC ....................................................... 709/217
See application file for complete search history.

(56) References Cited

U.S. PATENT DOCUMENTS

| | | | |
|---|---|---|---|
| 4,635,050 A * | 1/1987 | Grothe | G09G 1/07 345/16 |
| 5,499,325 A * | 3/1996 | Dugan, Jr. | G09G 1/07 345/589 |
| 6,154,289 A * | 11/2000 | Hara | H04N 1/00127 358/434 |
| 6,289,464 B1 * | 9/2001 | Wecker | G06F 1/1616 340/7.33 |
| 6,473,404 B1 * | 10/2002 | Kaplan | 370/238 |
| 6,741,737 B1 * | 5/2004 | Lenoir | G06F 17/243 382/176 |
| 7,137,126 B1 * | 11/2006 | Coffman | G06F 17/30899 704/200 |
| 7,359,705 B2 * | 4/2008 | Kornprobst | H04L 1/188 370/448 |

(Continued)

FOREIGN PATENT DOCUMENTS

| | | |
|---|---|---|
| JP | 9-251391 | 9/1997 |
| JP | 2011-041153 | 2/2011 |

*Primary Examiner* — O. C. Vostal

(74) *Attorney, Agent, or Firm* — Oblon, McClelland, Maier & Neustadt, L.L.P.

(57) ABSTRACT

An information processing apparatus includes a data receiver that receives data from one or more apparatuses, processing circuitry that determines a transfer priority of the data received by the data receiver based on data type, and a data transmitter that transfers the data to apparatuses other than the apparatus that transferred the data in accordance with the transfer priority. The processing circuitry determines if there is any data that has not been transferred during a predetermined data transfer period, and, based on determination indicating that there is data that has not been transferred, modifies the transfer priority of the data that has not been transferred to have a transfer priority higher than that of data to be transferred next, to cause the data transmitter to transfer the data having the modified transfer priority preferentially to apparatuses other than the apparatus that transferred the data.

10 Claims, 13 Drawing Sheets

| DATA TYPE | PRIORITY | MINIMUM GUARANTEED FREQUENCY (MILLISECONDS) |
|---|---|---|
| POINTING DATA | 1 | - |
| STROKE DATA | 2 | 100 |
| SOUND DATA | 3 | 200 |
| IMAGE DATA | 4 | 300 |
| MOVIE DATA | 5 | 400 |

(56) References Cited

U.S. PATENT DOCUMENTS

| | | | | |
|---|---|---|---|---|
| 7,370,076 B2* | 5/2008 | Friedman | G06Q 30/02 | 709/203 |
| 7,680,897 B1* | 3/2010 | Carter | H04L 12/5695 | 709/217 |
| 7,707,315 B2* | 4/2010 | Stultz | H04L 29/06 | 709/246 |
| 7,933,249 B2* | 4/2011 | Amalfitano | H04L 41/0896 | 370/335 |
| 7,983,455 B2* | 7/2011 | Moise | G06K 9/24 | 235/380 |
| 8,874,754 B2* | 10/2014 | Salinca | G06F 9/505 | 709/204 |
| 2002/0099854 A1 | 7/2002 | Jorgensen | H04L 1/20 | 709/249 |
| 2002/0181395 A1* | 12/2002 | Foster | H04L 49/357 | 370/229 |
| 2002/0194213 A1* | 12/2002 | Takayanagi | G01C 21/26 | 715/268 |
| 2003/0080948 A1* | 5/2003 | Lapstun | B41J 2/17503 | 345/173 |
| 2003/0093757 A1* | 5/2003 | Silverbrook | B41J 2/17503 | 715/230 |
| 2003/0115290 A1* | 6/2003 | Mori | H04M 3/51 | 709/219 |
| 2003/0195976 A1* | 10/2003 | Shiigi | G06Q 10/107 | 709/230 |
| 2004/0203722 A1* | 10/2004 | Lassers | H04L 67/26 | 455/423 |
| 2005/0099983 A1* | 5/2005 | Nakamura | H04L 45/20 | 370/338 |
| 2005/0120082 A1* | 6/2005 | Hesselink | H04L 63/0272 | 709/203 |
| 2005/0129036 A1* | 6/2005 | Sawabe | H04L 12/40143 | 370/401 |
| 2006/0159074 A1* | 7/2006 | Diebold | A61N 1/37252 | 370/352 |
| 2007/0153802 A1* | 7/2007 | Anke | H04L 47/10 | 370/395.42 |
| 2008/0071924 A1* | 3/2008 | Chilukoor | H04L 47/10 | 709/240 |
| 2009/0059937 A1* | 3/2009 | Kanada | H04L 41/5003 | 370/401 |
| 2009/0119773 A1* | 5/2009 | D'Amore | G06F 9/5011 | 726/21 |
| 2010/0064071 A1* | 3/2010 | Shimokawa | G06F 13/28 | 710/25 |
| 2010/0158039 A1* | 6/2010 | Koide | H04B 3/542 | 370/447 |
| 2011/0083093 A1* | 4/2011 | Oishi | G06Q 10/10 | 715/772 |
| 2011/0185052 A1* | 7/2011 | Nakahira | H04L 41/083 | 709/223 |
| 2011/0268119 A1* | 11/2011 | Pong | H04L 47/32 | 370/392 |
| 2011/0314145 A1* | 12/2011 | Raleigh | H04L 41/0893 | 709/224 |
| 2012/0102131 A1* | 4/2012 | Lin | H04L 12/66 | 709/207 |
| 2012/0212459 A1* | 8/2012 | Rusu | G06F 3/03545 | 345/179 |
| 2012/0243410 A1* | 9/2012 | Vedula | H04L 41/5025 | 370/235 |
| 2012/0246270 A1* | 9/2012 | Han | H04L 12/2602 | 709/217 |
| 2012/0252515 A1* | 10/2012 | Tian | H04B 7/024 | 455/512 |
| 2013/0103813 A1* | 4/2013 | Kukreja | H04L 47/2458 | 709/223 |
| 2013/0143524 A1* | 6/2013 | Hjelm | H04W 8/205 | 455/410 |
| 2013/0322255 A1* | 12/2013 | Dillon | H04L 47/22 | 370/236 |
| 2014/0063179 A1* | 3/2014 | Kawano | H04L 65/403 | 348/14.08 |
| 2014/0152543 A1* | 6/2014 | Hirabayashi | G06F 3/1462 | 345/156 |
| 2014/0245120 A1* | 8/2014 | Schwartz | G06K 9/00402 | 715/226 |
| 2014/0247463 A1* | 9/2014 | Kemmochi | H04N 1/00129 | 358/1.15 |
| 2014/0366041 A1* | 12/2014 | Stanley-Marbell | G06F 9/4825 | 719/318 |
| 2015/0089016 A1* | 3/2015 | Jellison, Jr. | H04L 65/60 | 709/217 |
| 2015/0106526 A1* | 4/2015 | Arndt | H04L 67/141 | 709/227 |
| 2015/0113117 A1* | 4/2015 | Jun | H04L 43/0876 | 709/224 |
| 2015/0119103 A1* | 4/2015 | Ngai | H04W 48/18 | 455/552.1 |
| 2015/0120852 A1* | 4/2015 | Bhat | H04L 67/322 | 709/207 |

* cited by examiner

| DATA PRIORITY | DATA TYPE | DATA SIZE (KILOBYTES) | MINIMUM GUARANTEED FREQUENCY (MILLISECONDS) |
|---|---|---|---|
| 1 | POINTING DATA | 1 | – |
| 2 | STROKE DATA | 50 | 200 |
| 3 | SOUND DATA | 200 | 500 |
| 4 | IMAGE DATA | 300 | 1000 |

FIG. 6

| NO. | ORIGIN (IP ADDRESS) | TIME STAMP | DATA TYPE | DATA SIZE (KILOBYTES) | DATA BODY |
|---|---|---|---|---|---|
| 1 | TERMINAL A (192.168.1.12) | 2013/10/08 12:00:01.200 | IMAGE DATA | 200 | ANY |
| 2 | TERMINAL B (192.168.1.15) | 2013/10/08 12:00:01.200 | POINTING DATA | 1 | ANY |
| 3 | TERMINAL B (192.168.1.15) | 2013/10/08 12:00:01.300 | POINTING DATA | 1 | ANY |
| 4 | TERMINAL A (192.168.1.12) | 2013/10/08 12:00:01.400 | IMAGE DATA | 300 | ANY |
| 5 | TERMINAL B (192.168.1.15) | 2013/10/08 12:00:01.500 | POINTING DATA | 1 | ANY |

FIG. 7

| ID | ORIGIN (IP ADDRESS) | TIME STAMP | DATA TYPE | DATA SIZE (KILOBYTES) |
|---|---|---|---|---|
| 1 | TERMINAL A (192.168.1.12) | 2013/10/08 12:00:00.000 | IMAGE DATA | 300 |
| 2 | TERMINAL B (192.168.1.15) | 2013/10/08 12:00:00.500 | POINTING DATA | 1 |
| 3 | TERMINAL A (192.168.1.12) | 2013/10/08 12:00:01.000 | IMAGE DATA | 400 |
| 4 | TERMINAL B (192.168.1.15) | 2013/10/08 12:00:01.000 | POINTING DATA | 1 |
| 5 | TERMINAL A (192.168.1.12) | 2013/10/08 12:00:01.100 | POINTING DATA | 1 |
| 6 | TERMINAL B (192.168.1.15) | 2013/10/08 12:00:01.200 | POINTING DATA | 1 |
| 7 | TERMINAL A (192.168.1.12) | 2013/10/08 12:00:01.200 | POINTING DATA | 1 |

FIG. 10

| DATA TYPE | PRIORITY | MINIMUM GUARANTEED FREQUENCY (MILLISECONDS) |
|---|---|---|
| POINTING DATA | 1 | — |
| STROKE DATA | 2 | 100 |
| SOUND DATA | 3 | 200 |
| IMAGE DATA | 4 | 300 |
| MOVIE DATA | 5 | 400 |

FIG. 11

| NO. | ORIGIN (IP ADDRESS) | TIME STAMP | DATA TYPE | DATA SIZE (KILOBYTES) | DATA BODY |
|---|---|---|---|---|---|
| 1 | TERMINAL A (192.168.1.12) | 2013/10/08 12:00:00.200 | IMAGE DATA | 200 | ANY |
| 2 | TERMINAL B (192.168.1.15) | 2013/10/08 12:00:00.200 | POINTING DATA | 1 | ANY |

FIG. 12

| ID | ORIGIN (IP ADDRESS) | TIME STAMP | DATA TYPE | DATA SIZE (KILOBYTES) |
|---|---|---|---|---|
| 1 | TERMINAL A (192.168.1.12) | 2013/10/08 12:00:00.000 | IMAGE DATA | 300 |
| 2 | TERMINAL B (192.168.1.15) | 2013/10/08 12:00:00.100 | POINTING DATA | 1 |

FIG. 13

| NO. | ORIGIN (IP ADDRESS) | TIME STAMP | DATA TYPE | DATA SIZE (KILOBYTES) | DATA BODY |
|---|---|---|---|---|---|
| 1 | TERMINAL A (192.168.1.12) | 2013/10/08 12:00:00.500 | IMAGE DATA | 200 | ANY |
| 2 | TERMINAL B (192.168.1.15) | 2013/10/08 12:00:00.500 | POINTING DATA | 1 | ANY |

FIG. 14

| ID | ORIGIN (IP ADDRESS) | TIME STAMP | DATA TYPE | DATA SIZE (KILOBYTES) |
|---|---|---|---|---|
| 1 | TERMINAL A (192.168.1.12) | 2013/10/08 12:00:00.100 | IMAGE DATA | 300 |
| 2 | TERMINAL B (192.168.1.15) | 2013/10/08 12:00:00.200 | POINTING DATA | 1 |

FIG. 17

| NO. | ORIGIN (IP ADDRESS) | TIME STAMP | DATA TYPE | DATA SIZE (KILOBYTES) | DATA BODY |
|---|---|---|---|---|---|
| 1 | TERMINAL A (192.168.1.12) | 2013/10/08 12:00:00.500 | POINTING DATA | 1 | ANY |

FIG. 18

| NO. | ORIGIN (IP ADDRESS) | TIME STAMP | DATA TYPE | DATA SIZE (KILOBYTES) | DATA BODY |
|---|---|---|---|---|---|
| 1 | TERMINAL A (192.168.1.12) | 2013/10/08 12:00:00.300 | IMAGE DATA | 200 | ANY |
| 2 | TERMINAL B (192.168.1.15) | 2013/10/08 12:00:00.400 | IMAGE DATA | 200 | ANY |

FIG. 19

| ID | TIME STAMP | DATA TYPE | DATA SIZE (KILOBYTES) |
|---|---|---|---|
| 1 | 2013/10/08 12:00:00.100 | IMAGE DATA | 300 |
| 2 | 2013/10/08 12:00:00.200 | POINTING DATA | 1 |

FIG. 20

| NO. | ORIGIN (IP ADDRESS) | TIME STAMP | DATA TYPE | DATA SIZE (KILOBYTES) | DATA BODY |
|---|---|---|---|---|---|
| 1 | TERMINAL A (192.168.1.12) | 2013/10/08 12:00:00.500 | POINTING DATA | 1 | ANY |
| 2 | TERMINAL A (192.168.1.12) | 2013/10/08 12:00:00.300 | IMAGE DATA | 200 | ANY |
| 3 | TERMINAL B (192.168.1.15) | 2013/10/08 12:00:00.400 | IMAGE DATA | 200 | ANY |

FIG. 21

| NO. | ORIGIN (IP ADDRESS) | TIME STAMP | DATA TYPE | DATA SIZE (KILOBYTES) | DATA BODY |
|---|---|---|---|---|---|
| 1 | TERMINAL A (192.168.1.12) | 2013/10/08 12:00:00.500 | POINTING DATA | 1 | ANY |

FIG. 22

| NO. | ORIGIN (IP ADDRESS) | TIME STAMP | DATA TYPE | DATA SIZE (KILOBYTES) | DATA BODY |
|---|---|---|---|---|---|
| 1 | TERMINAL A (192.168.1.12) | 2013/10/08 12:00:00.500 | IMAGE DATA | 200 | ANY |
| 2 | TERMINAL B (192.168.1.15) | 2013/10/08 12:00:00.600 | IMAGE DATA | 200 | ANY |

FIG. 23

| ID | ORIGIN (IP ADDRESS) | TIME STAMP | DATA TYPE | DATA SIZE (KILOBYTES) |
|---|---|---|---|---|
| 1 | TERMINAL A (192.168.1.12) | 2013/10/08 12:00:00.100 | IMAGE DATA | 300 |
| 2 | TERMINAL A (192.168.1.12) | 2013/10/08 12:00:00.200 | POINTING DATA | 1 |

FIG. 24

| NO. | ORIGIN (IP ADDRESS) | TIME STAMP | DATA TYPE | DATA SIZE (KILOBYTES) | DATA BODY |
|---|---|---|---|---|---|
| 1 | TERMINAL A (192.168.1.12) | 2013/10/08 12:00:00.500 | IMAGE DATA | 200 | ANY |
| 2 | TERMINAL A (192.168.1.12) | 2013/10/08 12:00:00.500 | POINTING DATA | 1 | ANY |
| 3 | TERMINAL B (192.168.1.15) | 2013/10/08 12:00:00.600 | IMAGE DATA | 200 | ANY |

INFORMATION PROCESSING APPARATUS, INFORMATION PROCESSING SYSTEM, AND COMMUNICATION CONTROL METHOD

CROSS-REFERENCE TO RELATED APPLICATION

This patent application is based on and claims priority pursuant to 35 U.S.C. § 119(a) to Japanese Patent Application No. 2014-085657, filed on Apr. 17, 2014 in the Japan Patent Office, the entire disclosure of which is hereby incorporated by reference herein.

BACKGROUND

Technical Field

The present invention relates to an information processing apparatus, an information processing system, and a communication control method.

Background Art

In electronic conference systems, conferences proceed by transferring video, audio, or handwriting data of a facilitator or an attendee of the conference to projectors and attendees' personal computers (PCs), thus displaying and outputting the data for each attendee to share the data among the attendees of the conference.

In such systems, handwritten information input using a mouse or a keyboard at a teleconference apparatus in one conference room is preferentially displayed on a display in another conference room. In that technology, handwritten information, etc., input is displayed preferentially, while interrupting display of other data, such that such handwritten information is displayed in real time.

SUMMARY

An example embodiment of the present invention provides a novel information processing apparatus that includes a data receiver that receives data from one or more apparatuses, processing circuitry that determines a transfer priority of the data received by the data receiver based on data type, and a data transmitter that transfers the data to apparatuses other than the apparatus that transferred the data in accordance with the transfer priority. The processing circuitry determines if there is any data that has not been transferred during a predetermined data transfer period, and, based on determination indicating that there is data that has not been transferred, modifies the transfer priority of the data that has not been transferred to have a transfer priority higher than that of data to be transferred next, to cause the data transmitter to transfer the data having the modified transfer priority preferentially to apparatuses other than the apparatus that transferred the data.

Further example embodiments of the present invention provide an information processing system incorporating the information processing apparatus and a communication control method for the information processing apparatus.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 6 is a diagram illustrating a data structure of data stored in a data storing unit as an embodiment of the present invention.

FIG. 7 is a diagram illustrating a data structure of history data stored in a data history storing unit as an embodiment of the present invention.

FIG. 10 is a diagram illustrating a data priority table as an embodiment of the present invention.

FIG. 11 is a diagram illustrating a first data group stored in the data storing unit as an embodiment of the present invention.

FIG. 12 is a diagram illustrating first history data stored in the data history storing unit as an embodiment of the present invention.

FIG. 13 is a diagram illustrating a second data group stored in the data storing unit as an embodiment of the present invention.

FIG. 14 is a diagram illustrating second history data stored in the data history storing unit as an embodiment of the present invention.

FIG. 17 is a diagram illustrating a data structure of data that the terminal C receives from the terminal A as an embodiment of the present invention.

FIG. 18 is a diagram illustrating a third data group stored in the data storing unit as an embodiment of the present invention.

FIG. 19 is a diagram illustrating third history data stored in the data history storing unit as an embodiment of the present invention.

FIG. 20 is a diagram illustrating a data group stored in the data storing unit after comparing data as an embodiment of the present invention.

FIG. 21 is a diagram illustrating a data structure of data that the terminal C receives from the terminal A as an embodiment of the present invention.

FIG. 22 is a diagram illustrating a fourth data group stored in the data storing unit as an embodiment of the present invention.

FIG. 23 is a diagram illustrating fourth history data stored in the data history storing unit as an embodiment of the present invention.

FIG. 24 is a diagram illustrating a data group stored in the data storing unit after comparing data as an embodiment of the present invention.

DETAILED DESCRIPTION

Figure 1:
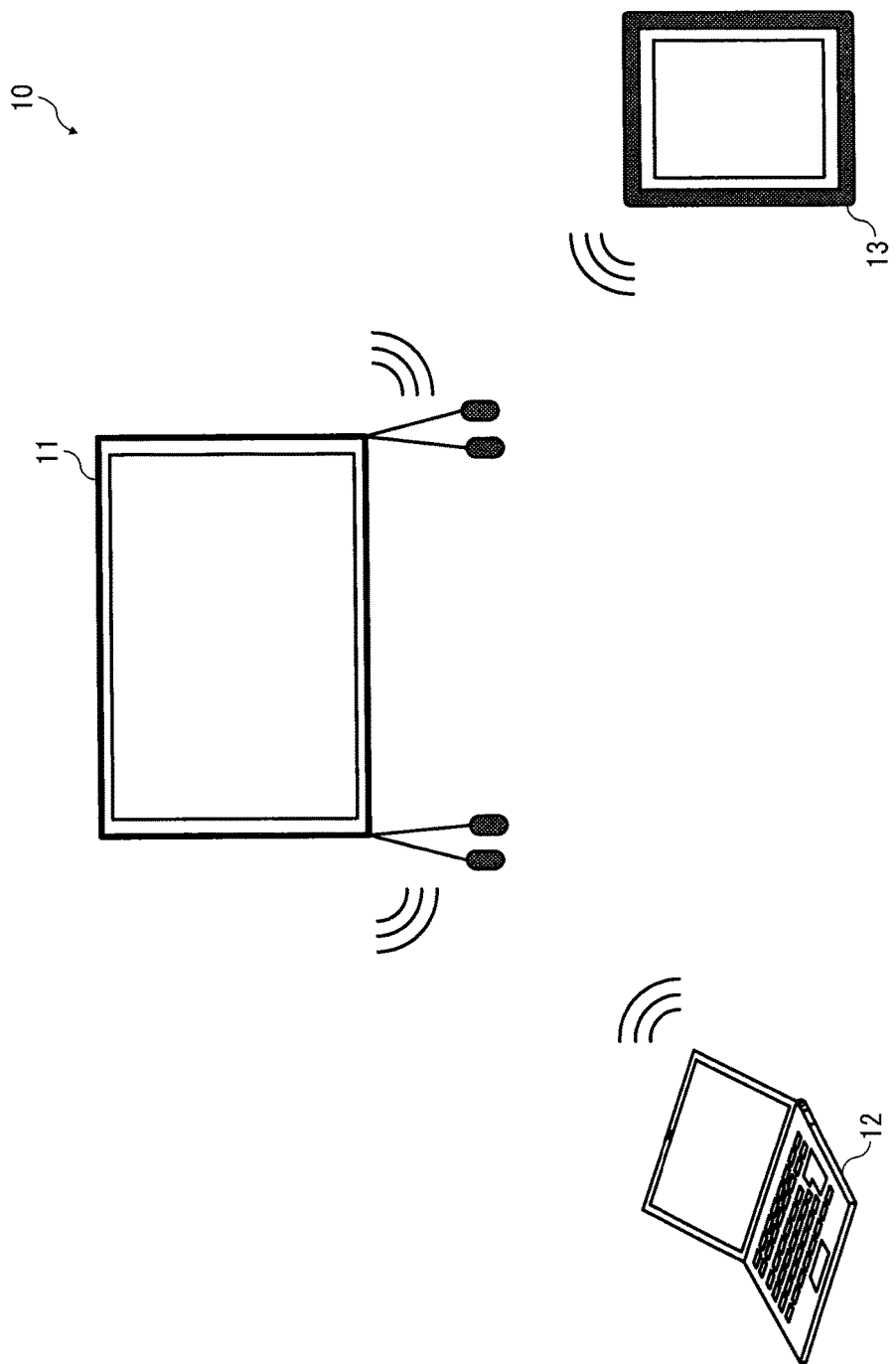
FIG. 1 is a diagram illustrating a configuration of a conference system as an information processing system including an information processing apparatus according to an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the following embodiment, an information processing apparatus that controls communication with multiple apparatuses to enable communication among users is provided.

FIG. 1 is a diagram illustrating a configuration of a conference system as an information processing system including an information processing apparatus in this embodiment. While a conference system is taken as an example here, the present invention can be applied to any system that requires communication control similar to the conference system.

A conference system 10 in FIG. 1 includes an electronic whiteboard 11 that includes a server function and terminals 12 and 13 as multiple apparatuses that communicate with the electronic whiteboard 11. The electronic whiteboard 11 and the terminals 12 and 13 are communicably connected with each other via a wired/wireless network. In FIG. 1, the terminal 12 is a notebook PC, the terminal 13 is a tablet device, and the electronic whiteboard 11 and the terminals 12 and 13 are connected with each other via the wireless network.

The electronic whiteboard 11, in one example, receives data from the terminals 12 and 13, respectively, and displays an enlarged image of the received data on a screen etc. In addition, the electronic whiteboard 11 receives information etc. handwritten on the screen by a user, such as a facilitator or an attendee of the conference, and displays such information. Furthermore, the electronic whiteboard 11 includes a scanner function and a printing function, such that the electronic whiteboard 11 scans an image drawn on the screen, and prints out the scanned image.

The electronic whiteboard 11 includes a server function and implements data sharing etc. by transferring data input at a terminal to another terminal. For example, the terminal 12 transfers data displayed on the terminal 12 to the electronic whiteboard 11 via the network, the electronic whiteboard 11 displays the data and transfers the data to the terminal 13, and the terminal 13 displays the data, to achieve data sharing. The server function that the electronic whiteboard 11 includes not only transferring/receiving of data but also includes predetermined processing such as data compression etc. and transferring the processed data. An interactive whiteboard etc. can be used as the electronic whiteboard 11.

In FIG. 1, the electronic whiteboard 11 includes the server function. However, the terminals 12 and 13 can include the server function depending on a performance requirement or a situation. It is also possible to separate the server function from the electronic whiteboard 11, and additionally provide a server apparatus that includes the server function separately. For example, in addition to the PC, workstation, and blade server etc., a multifunction peripheral (MFP) or a print server can be used as the server apparatus. The electronic whiteboard 11 can be connected to the server apparatus via the network. Alternatively, the electronic whiteboard 11 can be connected to the server apparatus directly using a cable.

The terminals 12 and 13 each include a display unit and various data and programs to cause the display unit to display data. In addition, in order to share data with each other, the terminals 12 and 13 transfer/receive data to/from the electronic whiteboard 11 that includes the server function via the network. Furthermore, the terminals 12 and 13 can receive information etc. handwritten over the data displayed on the display unit by user operation, display the input information on the display unit, and transfer the information to the electronic whiteboard 11.

The terminals 12 and 13 can not only use the display as the display unit but also use a touch panel that also functions as an input device as the display unit. In case of adopting the display as the display unit, in order to accept inputting the information, it is possible to prepare the input device such as a keyboard, mouse, and pad etc. In addition, the terminals 12 and 13 can include a sound input device such as a microphone, a sound output device such as a speaker, and an image pickup device etc. As a result, it is possible to transfer/receive various data such as audio data, image data of captured image, and video data of captured video and share those data.

In addition to the notebook PC and the tablet device described above, it is possible to use a desktop PC, smartphone, or Personal Digital Assistant (PDA) as the terminals 12 and 13.

Examples of data that the terminals 12 and 13 transfers to the electronic whiteboard 11 are image data, video data, audio data, stroke (handwritten input) data, text data, and pointing data etc.

The conference system 10 prioritizes the various received data in accordance with the conference situation using the server function included in the electronic whiteboard 11 and transfers each data in accordance with the priority. In this case, the conference situation is any situation that can be recognized by content of various data received/transferred from/to the terminals 12 and 13 etc. during the conference and an order of the history data along with the conference time base. For example, if a large amount of audio data is transferred from the terminal 12 in a specific period of time, it is possible to recognize that a user who utilizes the terminal 12 says something during that time period.

In this case, if another user uses the terminal 13 and handwrites on the terminal 13 to add remarks collaterally, the conference system 10 prioritize the stroke data with higher priority than the audio data. As a result, the conference system 10 transfers the stroke data over the audio data preferentially. Consequently, it is possible for the other user to explain the user remarks collaterally superimposing the handwritten input on the user remarks, thus facilitating communication among users.

In case of keeping receiving the stroke data with high priority, the audio data with low priority is not transferred, and the sound breaks up. As a result, it is difficult to maintain communication. However, in the conference system 10, even if the interruption of the data with high priority continues, the sound does not break up since it is configured that the data with low priority is transferred at a predetermined time interval. As a result, it is possible to maintain communication.

The conference system 10 in FIG. 1 includes one electronic whiteboard 11 and two terminals 12 and 13. However, the configuration is not limited to the case described above, and it is possible to include two or more electronic whiteboards and three or more terminals. In addition, the conference system 10 can include apparatuses other than the electronic whiteboard 11 and the terminals 12 and 13. In that case, it is possible to install those apparatuses not inside the same conference room but in a remote conference room with each other.

Figure 2:
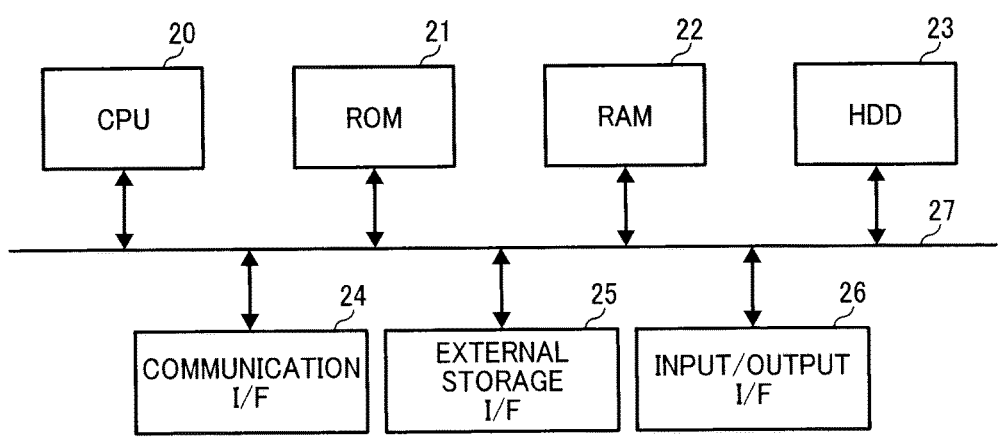
FIG. 2 is a diagram illustrating a hardware configuration of an electronic whiteboard as the information processing apparatus in FIG. 1 as an embodiment of the present invention.

A hardware configuration to implement the above process is described below with reference to FIG. 2. FIG. 2 is a diagram illustrating a hardware configuration to implement the server function that the electronic whiteboard 11 includes in this embodiment. While the electronic whiteboard 11 includes a display device, an input device, a scanning device, and a printing device, in this case, only the hardware configuration of a part that implements the server function is described below. Since the terminals 12 and 13 include the same hardware configuration as shown in FIG. 2, the description regarding the terminals 12 and 13 is omitted.

It is possible to adopt the hardware configuration shown in FIG. 2 similar to general PCs, and a CPU 20 that controls the whole electronic whiteboard 11 is included. In addition, the electronic whiteboard 11 includes a ROM 21 that stores a boot program and firmware and a RAM 22 used as a work area for the CPU 20.

The electronic whiteboard 11 includes a HDD 23 that stores a program to implement the server function and information related to the server function process. While the configuration described above includes the HDD 23, it is possible to adopt a configuration that uses a Solid State Drive (SSD). Furthermore, in FIG. 2, an external storage I/F 25 such as a media drive that controls read/write data from/to a storage medium such as a flash memory etc.

The electronic whiteboard 11 includes a communication I/F 24 that transfers/receives data to/from the terminals 12 and 13 via the network and a bus line 27 such as an address bus and a data bus to connect the above-described devices with each other. In addition, the electronic whiteboard 11 includes an input/output I/F 26 that connects the display device, the sound output device such as the speaker, the scanning device, the printing device, and the input device such as the keyboard, the mouse, and the microphone, and controls data input/output with the connected device.

It is possible to provide the program described above storing the storage medium described above, and it is also possible to provide the program by downloading from a content server. Regarding the terminals 12 and 13, a program to implement data sharing that transfers/receives data and displays the data on the screen is provided.

Figures 3, 4:
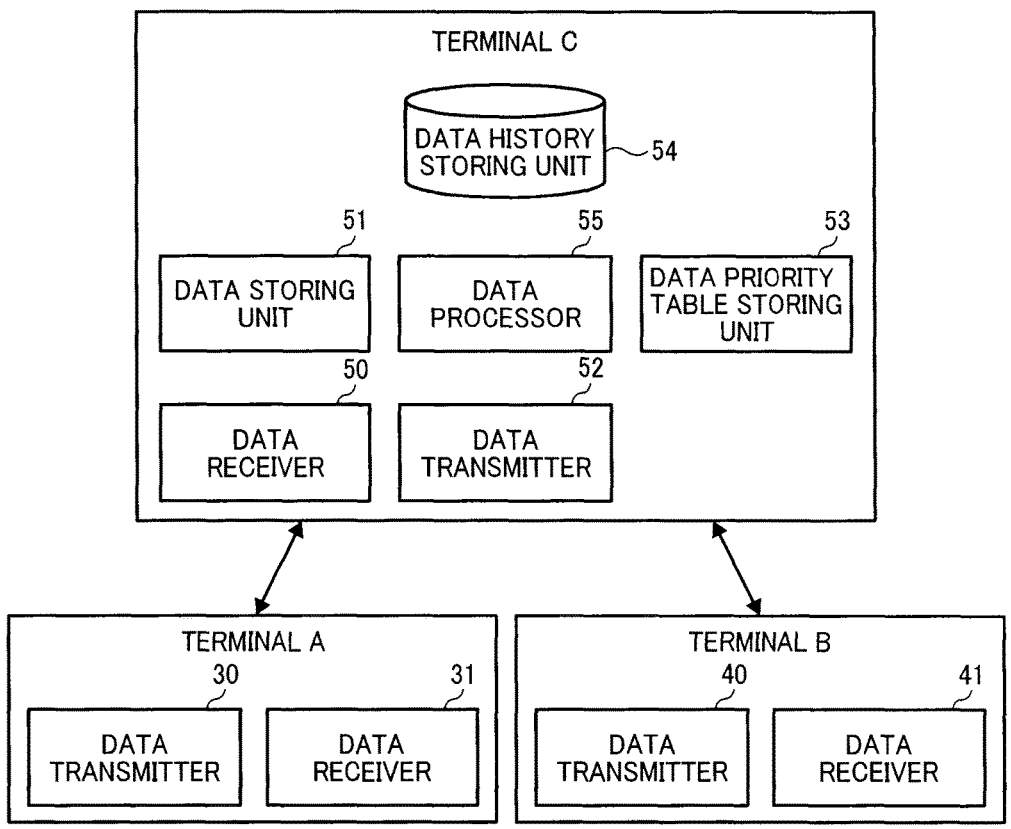
FIG. 3 is a block diagram illustrating a functional configuration of a terminal C as the information processing apparatus in FIG. 1 and terminals A and B as multiple apparatuses as an embodiment of the present invention.
FIG. 4 is a diagram illustrating a data priority table as an embodiment of the present invention.

Functions that the electronic whiteboard 11 and the terminals 12 and 13 included in the conference system implement are described below with reference to FIG. 3. The terminal 12 is referred to as a terminal A, the terminal 13 is referred to as a terminal B, and the electronic whiteboard 11 is referred to as a terminal C hereinafter. The terminals A and B include the same functions and include data transmitters 30 and 40 that transfer data and data receivers 31 and 41 that receive data as functional units. Those functional units are implemented by the CPU, the RAM, the HDD, and the communication I/F that the terminals A and B include.

The data transmitters 30 and 40 transfer data that the terminals A and B store to the terminal C via the network. For example, the data is displayed on the display unit included in the terminals A and B and includes the video data, the image data, the audio data, the stroke data, the text data, and the pointing data, etc., described above. The stroke data includes the handwritten input information, and the pointing data includes coordinate information where an arbitrary area on the screen is indicated. The handwritten input information includes multiple sets of coordinate information where information is handwritten input.

The data receivers 31 and 41 each receive data from the terminal C via the network. The data receivers 31 and 41 transfers the received data to an output controller, which may be implemented by the input/output I/F 26 under control of the CPU 20. The data receivers 31 and 41 each instruct the output controller to output the data on the display unit and the sound output unit. In outputting the data, it is possible that the output controller adjusts a display size and a volume of the sound and outputs the adjusted image and the adjusted sound. In this case, the output controller that performs processing to adjust data is included. However, it is possible that the data receivers 31 and 41 transfer the data to the display unit and the sound output unit directly, without performing any further processing, and output the data through the display unit and the sound output unit.

The terminal C includes a data receiver 50, a data storing unit 51, a data transmitter 52, a data priority table storing unit 53, a data history storing unit 54, and a data processor 55 as its functional units. The data receiver 50, which may be implemented by the communication I/F 24, receives data from at least one of the terminals A and B via the network. The data storing unit 51, which may be implemented by any memory such as the RAM, stores the data received by the data receiver 50. The data transmitter 52, which may be implemented by the communication I/F 24, transfers data stored in the data storing unit 51 to the terminal A or the terminal B. That is, the data transmitter 52 transfers data transferred by a terminal to another terminal that does not transfer the data. As a result, it is possible to implement data sharing.

After the data transmitter 52 transfers the data, the data is deleted from the data storing unit 51. This is because it is waste of memory to keep storing the data that has already been transferred.

The data priority table storing unit 53, which may be implemented by any memory, as an information storing unit stores a data priority table as data priority information that defines data transfer priority. The data priority table is described in detail later. The data history storing unit 54 stores information on transferred data as history information (history data).

The data processor 55, which may be implemented by instructions from the CPU, determines current situation of a conference with reference to the data and the data priority table stored in the data storing unit 51 and the history data stored in the data history storing unit 54. Subsequently, the data processor 55 determines whether or not it is desired to transfer the data preferentially based on the determined situation and determines the priorities.

The data processor 55 rearranges the data stored in the data storing unit 51 in accordance with the determined priorities at any desired time. Subsequently, the data processor 55 retrieves the first data in the data storing unit 51 arranged in accordance with the priorities and transfers the retrieved data to the data transmitter 52.

In passing the data to the data transmitter 52, the data processor 55 deletes the data from the data storing unit 51 and instructs the data history storing unit 54 to store the history data. It is also possible that the data processor 55 deletes that data after receiving a notification that the data transmitter 52 finishes transferring the data and instructs to store the history data.

As described above, since the data is rearranged after detecting the current situation and determining whether or not the data is to be transferred preferentially, it is possible to prevent keeping transferring the specific type of data and transfer other types of data appropriately.

The data priority table stored in the data priority table storing unit 53 is described below with reference to FIG. 4. FIG. 4 is a diagram illustrating a data structure of the data priority table in this embodiment. For example, it is possible to prioritize data having a smaller data size. In FIG. 4, the pointing data is 1 kilobyte, the stroke data is 50 kilobytes, the audio data is 200 kilobyte, and the image data is 300 kilobytes. Therefore, the priorities are determined in that order.

It is possible to calculate an average using multiple data for each data type and use the calculated average. It is also possible to calculate an average dynamically and use the calculated average. In case of calculating the average dynamically, it is possible to update the table depending on the calculated size at any desired time. For example, it is possible to update the table when communication bandwidth of the network becomes narrow or software is updated etc.

In addition to the data priority and the data size, a specified period of time referred to as "minimum guaranteed frequency" is associated with each data type. The minimum guaranteed frequency is determined so that the data is transferred during the specified period of time at least once whatever the situation of terminal C, and it is specified in accordance with the data type. If there is data that has not been transferred within the minimum guaranteed frequency is stored in the data storing unit 51 since the last time that the data is transferred, such data is transferred immediately, such that any type of data is prevented from being transferred for a long period of time.

It is possible that a predetermined period of time is specified as the minimum guaranteed frequency. Alternatively, the minimum guaranteed frequency is updated dynamically in accordance with the change of the communication bandwidth of the network and the change of the number of connected terminals etc.

Figure 5:
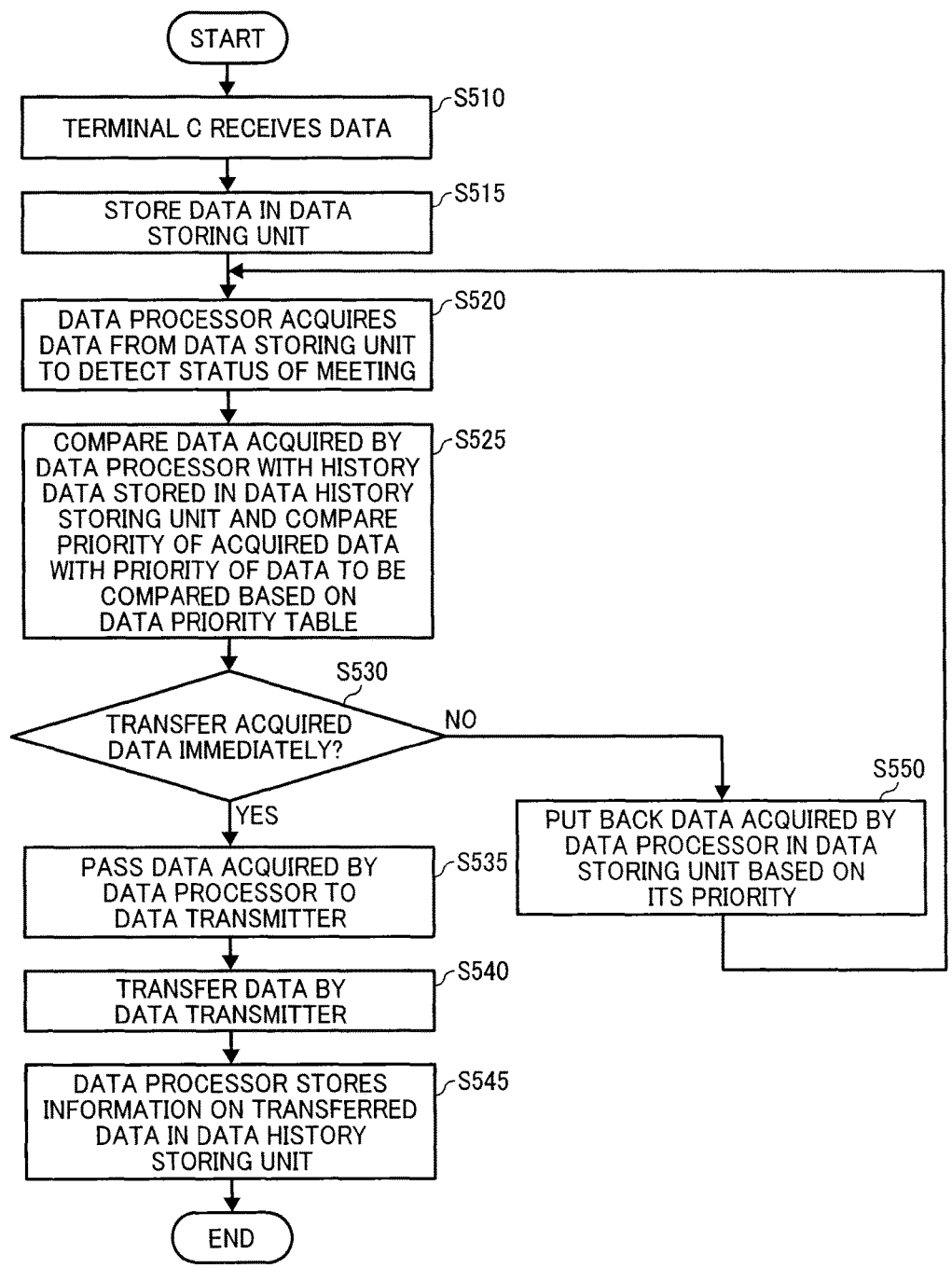
FIG. 5 is a flowchart illustrating a process executed by the conference system in FIG. 1 as an embodiment of the present invention.
Figure 8:
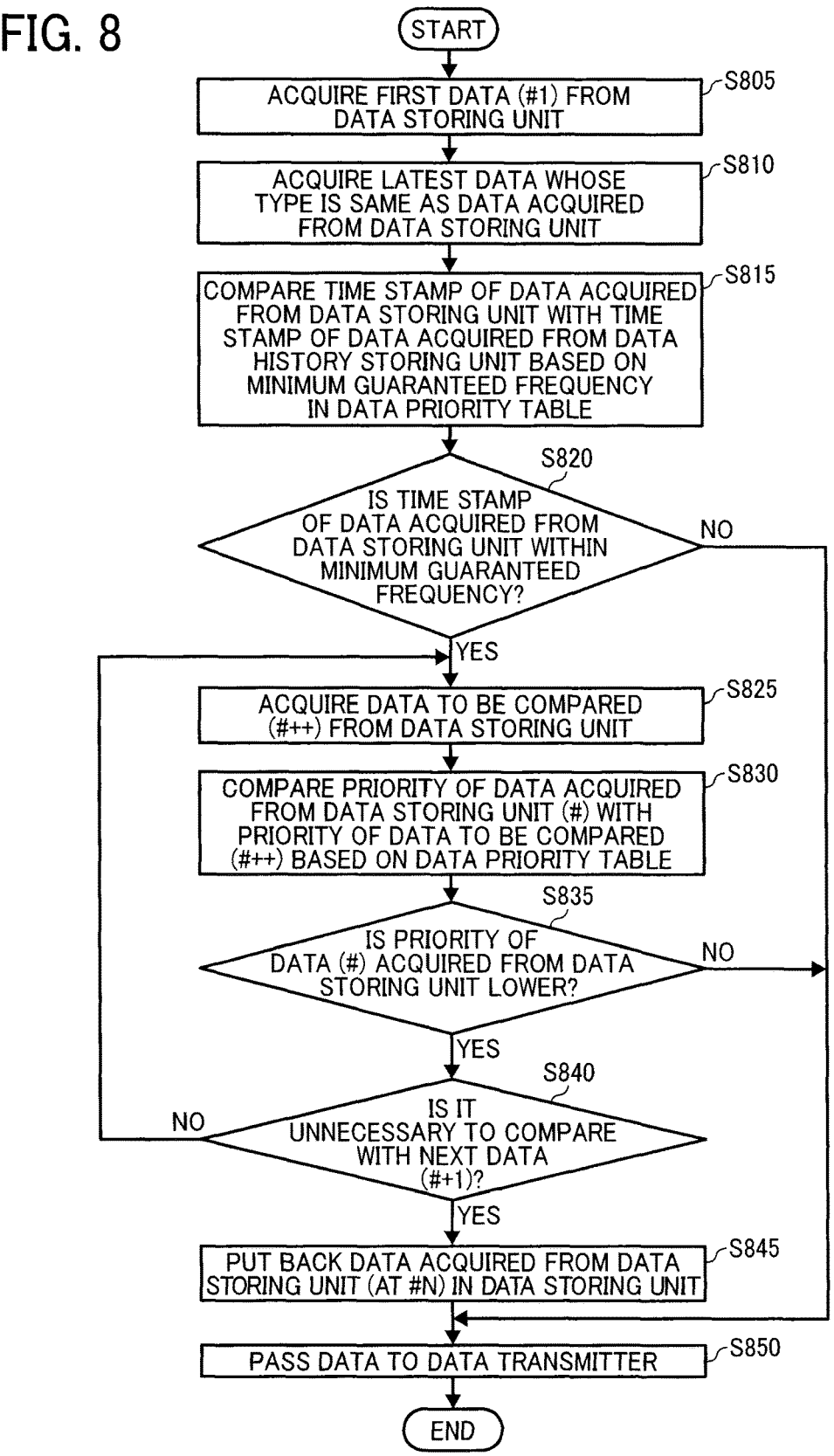
FIG. 8 is a flowchart illustrating a process executed by a data processor in FIG. 3 as an embodiment of the present invention.

A particular process by the terminals A to C is described below with reference to FIGS. 5 to 8. FIG. 5 is a flowchart illustrating a process executed by the conference system 10 in this embodiment. FIG. 6 is a diagram illustrating a data structure of data stored in the data storing unit 51 in this embodiment. FIG. 7 is a diagram illustrating a data structure of the history data stored in the data history storing unit 54 in this embodiment. FIG. 8 is a flowchart illustrating a detailed process that detects the conference situation and determines the priorities executed by the data processor 55 in the electronic whiteboard 11 in this embodiment.

First, the process that the conference system 10 executes is described below with reference to FIG. 5. In this case, the conference situation and the priorities are determined in response to transfer of data by the terminal C (i.e., just before transferring the data). In the conference system 10, alternatively, it is possible to execute the process above in response to receiving of data by the terminal C (i.e., just after receiving the data). This case is described in detail later. The time for executing this process may not only be limited to the timing just before transferring the data or just after receiving the data but also at any desired time.

The process starts after arbitrary data is selected and it is instructed to transfer the data on the terminal A by user operation. The data to be transferred can be acquired by user input. Alternatively, it is possible to transfer the data acquired by the image pickup device etc. More specifically, the terminal A may receive a user instruction that instructs to transfer the data by pressing a data transfer key etc. In response to receiving the instruction, the terminal A transfers the data to the terminal C that includes the server function via the network.

In S510, the data receiver 50 in the terminal C receives the data from the terminal A. Since the received data will be used later, the received data is stored in the data storing unit 51 in S515. In storing the data in the data storing unit 51, information referred to as time stamp that indicates date/time at when the data is received is added to the data.

FIG. 6 is a diagram illustrating a data structure of data stored in the data storing unit 51 in this embodiment. The data is stored in the order of time stamp added to the data. The data includes the time stamp, identification information such as a name of a source device and IP address, data type, data size, and data body. That information is stored in the data structure described above. Content of the data body depends on the data type.

First-In-First-Out (FIFO) queue structure is adopted as the data structure, and the data #1 is picked up by the data processor 55 and transferred to the data transmitter 52. In FIG. 6, the first image data #1 transferred from the terminal A is the data to be picked up first, and the third pointing data #5 transferred from the terminal B is stored most recently. After picking up and transferring the data #1, the data #1 is deleted, and the data #2 is moved forward to #1.

Back to FIG. 5, in S520, the data processor 55 in the terminal C retrieves data from the data storing unit 51 to determine the conference situation. The retrieved data is the first data stored in the data storing unit 51, i.e., data #1. In S525, based on the data priority table, the retrieved data is compared with the history data stored in the data history storing unit 54, and the priority of the retrieved data is compared with the priority of the data to be compared.

FIG. 7 is a diagram illustrating the history data stored in the data history storing unit 54 in this embodiment. The history data transferred earlier is stored earlier. Since the time stamp is added as information that indicates date/time when an event such as transferring data etc. occurs, the history data is stored in the order of the time stamp. The history data consists of information (header information) only without a data body. As a result, in FIG. 7, only the time stamp, identification information such as the name of the source terminal and IP address etc., the data type, and the data size are stored as information for each data.

Back in FIG. 5, in S525, the time stamp added to the retrieved data is compared with the latest time stamp among time stamps added to data whose type is the same. Subsequently, the data processor 55 calculates how long time elapses after transferring data last time. After that, the calculated elapsed time is compared with the minimum guaranteed frequency of the same type of data stored in the data priority table. The process described above is performed to determine whether or not the data is within the minimum guaranteed frequency as the specified period of time. In addition, the priority is compared with the priority of the data to be compared (described later). The process described above is performed to determine whether or not the data has the highest priority if the data is within the minimum guaranteed frequency.

In S530, based on the comparison result, it is determined whether or not the data is transferred immediately. If the calculated elapsed time is longer than the minimum guaranteed frequency, it is determined to transfer the data immediately since the data has not been transferred during the specified period of time. In addition, if the data is within the minimum guaranteed frequency and the priority of the data is higher than the priority of the data to be compared, it is determined to transfer the data immediately since the data has higher priority than any other data type. Those processes are described in detail later.

If it is determined to transfer the data immediately, the process proceeds to S535, and the data processor 55 passes the retrieved data to the data transmitter 52. Subsequently, in S540, the data transmitter 52 transfers the data to the terminal B. In this case, since the data is received from the terminal A and it is unnecessary to transfer the data to the terminal C, the data is transferred to the terminal B only. Subsequently, in S545, the information on the data transferred by the data processor 55 is stored in the data history storing unit 54 as the history data, and the process ends.

If it is determined that it is unnecessary to transfer the data immediately in S530, the process proceeds to S550, and the retrieved data is returned to the data storing unit 51 based on the priority in the data priority table. In returning the data to the data storing unit 51, the order of data stored in the data storing unit is permutated if needed. Subsequently, the process returns to S520. After picking up the next data, it is determined whether or not it is desired to transfer the data immediately.

Steps S520 to S545 executed by the data processor 55 are described in detail below with reference to FIG. 8. After storing the data in the data storing unit 51 in S515, the data processor 55 starts the process. In S805, the data processor 55 retrieves the top data #1 to be transferred first among data stored in the data storing unit 51.

In S810, the data processor 55 retrieves the latest history data whose data type is the same as the data #1 stored in the data history storing unit 54. In S815, the data processor 55 calculates elapsed time since the data is transferred last time from the time stamp of the retrieved data and the time stamp of the history data. After that, the data processor 55 compares the calculated elapsed time with the minimum guaranteed frequency corresponding to the same type of data in the data priority table.

In S820, it is determined whether or not the calculated elapsed time is within the minimum guaranteed frequency. If it is determined that the data is within the minimum guaranteed frequency, the process proceeds to S825, and acquires the data to be compared (data #++) from the data storing unit 51. The data to be compared can be data with different data type placed nearest to the data #1. In S830, the priority of the retrieved data (#) is compared with the priority of the data to be compared (#++) based on the data priority table.

In S835, after the comparison, it is determined whether or not the priority of the data (#) picked up from the data storing unit 51 is lower. If the priority of the data (#) is lower, the process proceeds to S840, and it is determined whether or not it is unnecessary to compare the data (#) with the next data (#+1). If it is determined that it is desired to compare the data, the process returns to S820, and next data to be compared is picked up. By contrast, if it is determined that it is unnecessary to compare with the next data, the process proceeds to S845, and the retrieved data is returned to the data storing unit 51. The data is supposed to be returned to a place where the data to be compared was located (#=N) since the data has lower priority than the data to be compared.

For example, if two different types of data are stored in the data storing unit 51, after picking up the data #1, the data to be compared becomes data #2. After the comparison, if the priority of the data #1 is lower, the data #1 is returned to the position where the compared data #2 was located. As described above, by returning the data to the predetermined position, the data stored in the data storing unit 51 is permutated. In S850, the first data stored in the data storing unit 51 is picked up, and the retrieved data is passed to the data transmitter 52. Subsequently, the process ends.

If it is determined that the data is not within the minimum guaranteed frequency in S820 and it is determined that the priority is higher in S835, the process proceeds to S850. In these cases, the retrieved data for the comparison is passed to the data transmitter 52.

A process that detects the conference situation just before transferring the data and determines the priority is described below in detail with reference to a specific case. First, a relationship among terminals A to C and data flow is described below with reference to FIGS. 9A to 9C. For example, it is assumed that a user A owns the terminal A, a user B owns the terminal B, and they have a conference at a conference room. In the conference room, the terminal C (e.g., an interactive whiteboard) is installed. As a result, there are terminals A to C in the conference room.

Figure 9A:
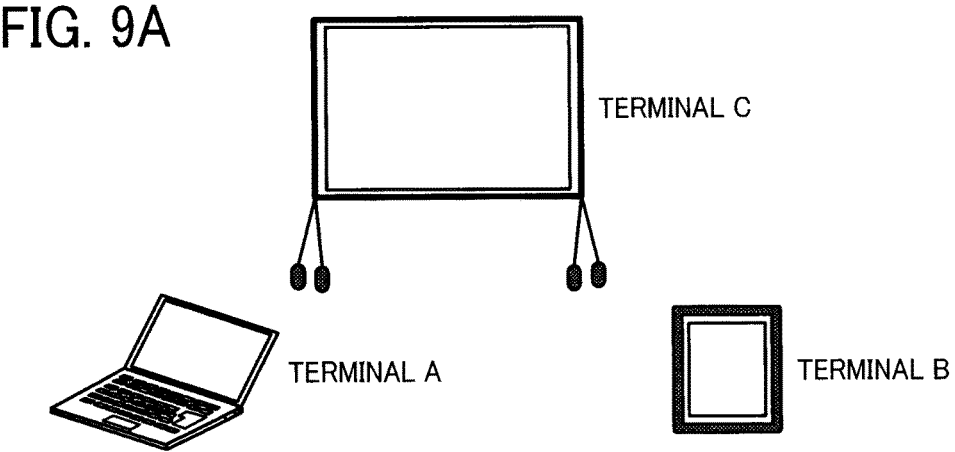
FIGS. 9A-9C are diagrams illustrating a case that the electronic whiteboard and terminals share a screen in the conference system in FIG. 1 as an embodiment of the present invention.

The terminal C includes the server function, and the terminals A and B as the client terminals can connect to the terminal C via the network. In FIG. 9A, a virtual conference room is created on the network with the terminal C that centrally manages communication, and the user A with the terminal A and user B with the terminal B attend the conference via the network at the virtual conference room.

Figure 9B:
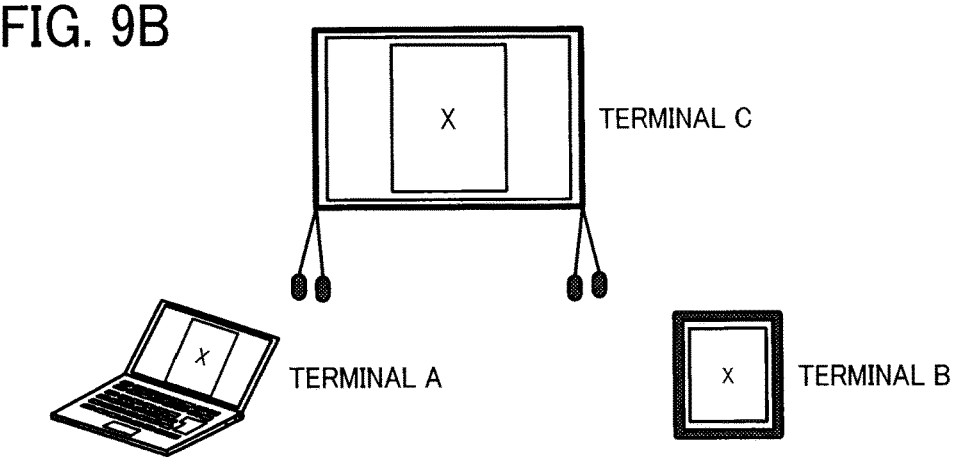

As shown in FIG. 9B, the terminal A starts sharing the screen with all attendees (the terminals B and C). For example, the terminal A transfers image data to the terminal C. Subsequently, the terminals A and C share the image data. The terminal C transfers the image data to the terminal B. As a result, the terminals A to C share the image data.

It is assumed that a discussion on an image X takes place under the condition shown in FIG. 9B and the user B wants to talk about the image X on the terminal B. After the user B points at a position where the user B wants to talk about on the terminal B, pointing information is displayed at the same position on the screen of the terminals A and C as shown in FIG. 9C.

In the process described above, after pointing at an arbitrary position on the screen of the terminal B, coordinates data of the pointed position is transferred as pointing data to the terminal C. After receiving the pointing data, the terminal C displays the pointing data on its screen and transfers the pointing data to the terminal A. As a result, the terminals A to C share the pointing data.

Figure 9C:
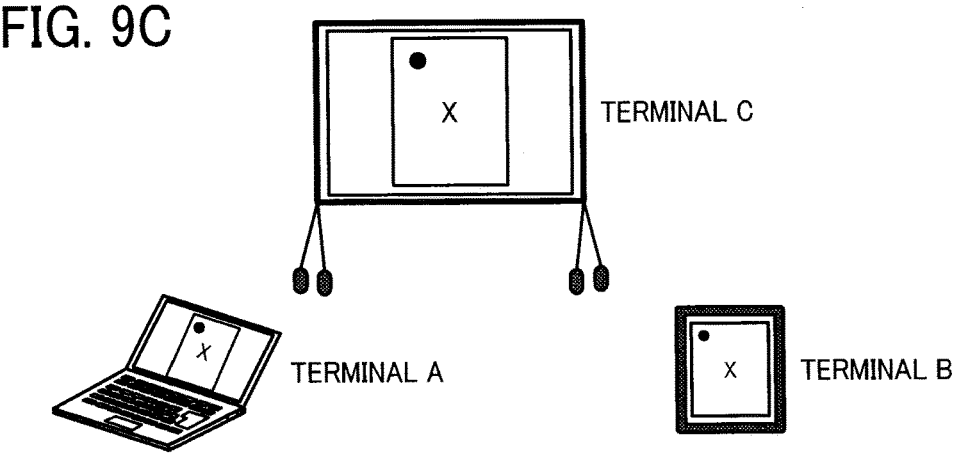

It is desired to share the pointing information shown in FIG. 9C to communicate with each other. while keeping sharing of the screen shown in FIG. 9B. The image data size is larger than the pointing data size. If the image data is transferred continuously, it takes time until the pointing data is transferred, and users feel the delay. As a result, that spoils bidirectional communication. To cope with this issue, the communication is maintained by prioritizing operations that reflect user will such as pointing etc. and transferring the data preferentially.

The priority is determined by comparing with the history data in FIG. 7 based on the data priority table in FIG. 6. It is assumed that the current data priority table is shown in FIG. 10. In addition, it is assumed that the terminals start transferring/receiving data at 12:00:00.000 on Oct. 8, 2013. On the data priority table, priorities are defined in accordance with the data type, and the minimum guaranteed frequencies are configured.

A case that the pointing data is prioritized over transferring the image data is described below. FIG. 11 is a diagram illustrating a first data group stored in the data storing unit 51 in this embodiment. FIG. 12 is a diagram illustrating a first history data stored in the data history storing unit 54 in this embodiment. Regarding the order of picking up the data from the data storing unit 51, as shown in FIG. 11, the image data is picked up firstly, and the pointing data is picked up secondly. Regarding the data priorities, as shown in FIG. 10, priority 1 is the pointing data, and priority 4 is the image data. That is, the priority of the pointing data is higher than the image data.

Here, the history data in FIG. 12 indicates that the image data was transferred at 12:00:00.000 on Oct. 8, 2013. As shown in FIG. 11, the time stamp of the image data to be transferred is 12:00:00.200 on Oct. 8, 2013, and 200 milliseconds have elapsed since transferring data last time. With reference to FIG. 10, the minimum guaranteed frequency of the image data is 300 milliseconds, and it is desired to guarantee to transfer data once within 300 milliseconds. In this case, since there is some time until the minimum guaranteed frequency expires, it is controlled that the pointing data with higher priority than the image data is to be transferred.

In the case described above, there is some time until the minimum guaranteed frequency expires. A case that the minimum guaranteed frequency expires is described below. FIG. 13 is a diagram illustrating a second data group stored in the data storing unit 51 in this embodiment. FIG. 14 is a diagram illustrating a second history data stored in the data history storing unit 54 in this embodiment. Regarding the order of picking up the data from the data storing unit 51, as shown in FIG. 13, the image data is picked up firstly, and the pointing data is picked up secondly.

Here, the history data in FIG. 14 indicates that the image data was transferred at 12:00:00.100 on Oct. 8, 2013. As shown in FIG. 13, the time stamp of the image data to be transferred is 12:00:00.500 on Oct. 8, 2013, and 400 milliseconds have elapsed since transferring data last time. Since the minimum guaranteed frequency of the image data is 300 milliseconds and it is desired to guarantee to transfer the data once within 300 milliseconds, the image data is transferred, and the pointing data is not transferred preferentially.

The case that the terminal C detects the conference situation and determines priority etc. just before transferring data has been described above. A case that those processes are performed just after receiving data is described below. In that case, if the electronic whiteboard 11 accepts a lot of data from multiple terminals and there is sufficient network bandwidth, the transferring process goes smoothly by not executing processes before transferring data. In this case, it is possible to enhance system performance by executing processes just after receiving data.

Figure 15:
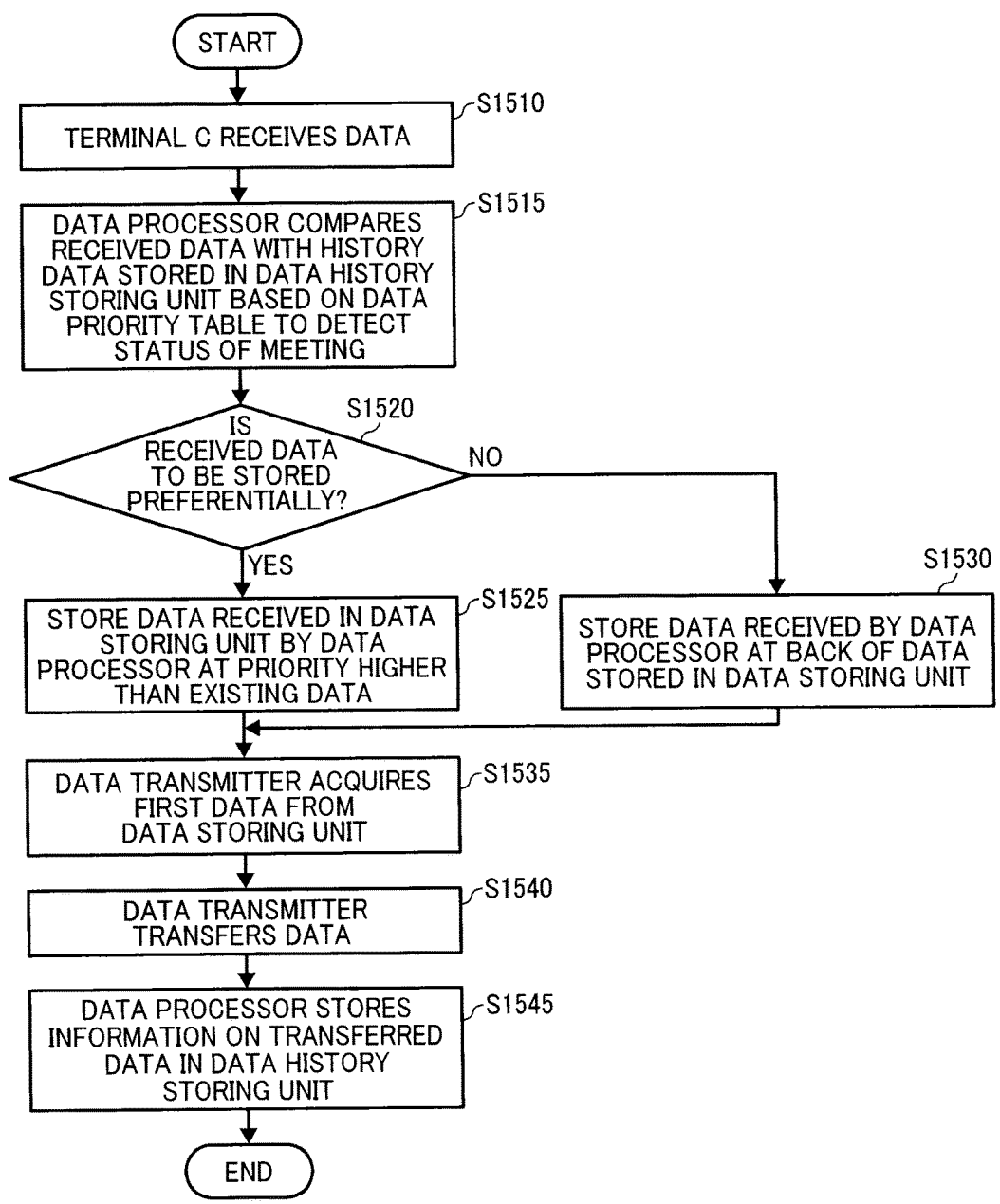
FIG. 15 is a flowchart illustrating a process executed by the conference system in FIG. 1 as an embodiment of the present invention.
Figure 16:
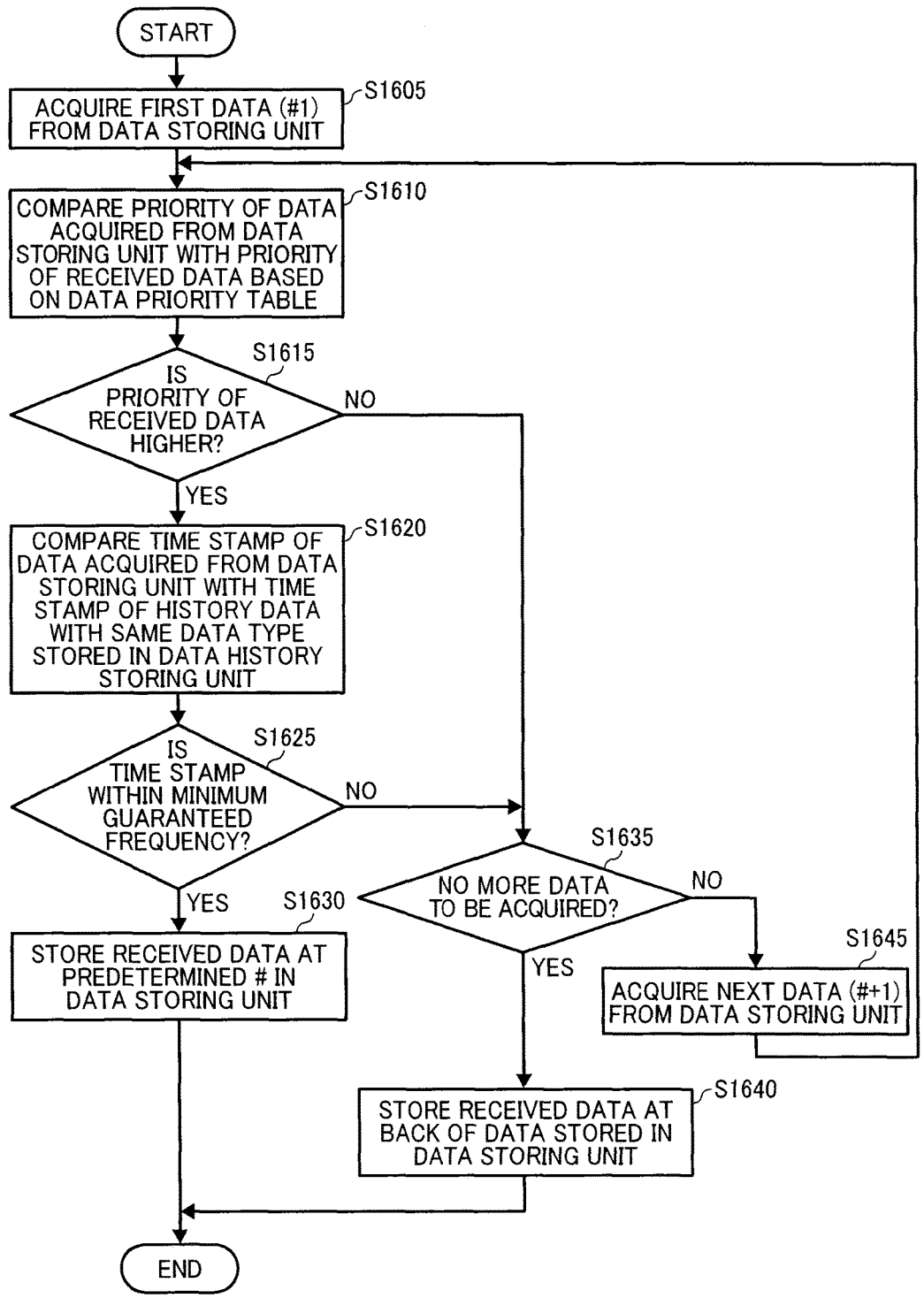
FIG. 16 is a flowchart illustrating a process executed by the data processor in FIG. 3 as an embodiment of the present invention.

FIG. 15 is a flowchart illustrating a process executed by the terminal C of the conference system 10 in this embodiment. FIG. 16 is a flowchart illustrating a detailed process that detects the conference situation and determines the priorities executed by the data processor 55 in the electronic whiteboard 11 in the process in FIG. 15.

First, the process that the conference system 10 executes is described below with reference to FIG. 15. In this case, the conference situation is detected and the priorities are determined just after the terminal C receives the data.

The process starts after arbitrary data is selected and it is instructed to transfer the data on the terminal A by user operation. The data to be transferred can be acquired by user input. Alternatively, it is possible to transfer the data acquired by the image pickup device etc. It is possible to instruct to transfer the data by pressing a data transfer key etc. After receiving the instruction, the terminal A transfers the data to the terminal C that includes the server function via the network.

In S1510, the data receiver 50 in the terminal C receives the data. In this case, the received data is used immediately. Therefore, the received data is not stored in the data storing unit 51. It should be noted that a time stamp is added to the data in receiving the data.

In S1515, in order to detect the conference situation, the data processor 55 in the terminal C compares the received data with the history data stored in the data history storing unit 54 based on the data priority table.

In S1520, it is determined whether or not the received data is stored in the data storing unit 51 in advance of data that has already been stored. That is, it is determined whether or not the received data is stored not in the tail end of stored data but in the top or in the middle of stored data. The process is described in detail below with reference to FIG. 16.

If it is determined that the received data is stored in advance of stored data, the process proceeds to S1525, and the data processor 55 stores the received data in the data storing unit 51 with the transferring priority in advance of existing data. By contrast, if it is determined that the received data is not stored in advance of stored data, the process proceeds to S1530, and the data processor 44 stores the received data in the data storing unit 51 in the tail end of data that has already been stored.

In S1535, the data transmitter 52 retrieves the top data from the data storing unit 51, and the data transmitter 52 transfers the retrieved data to the terminal B. Subsequently, in S1545, the information on the data transferred by the data processor 55 is stored in the data history storing unit 54 as the history data, and the process ends.

Steps S1515 to S1530 executed by the data processor 55 are described in detail below with reference to FIG. 16. After the data receiver 50 receives the data in S1510, the data processor 55 starts the process. In S1605, the data processor 55 retrieves the top data #1 to be transferred first among data stored in the data storing unit 51.

In S1610, in order to detect the conference situation, the data processor 55 compares the priority of the retrieved data from the data storing unit 51 with the priority of the received data based on the data priority table.

In S1615, it is determined whether or not the priority of the received data is high. If it is determined that the priority of the data is high, the process proceeds to S1620, and the time stamp of the retrieved data from the data storing unit 51 with the time stamp of the history data stored in the data history storing unit 54. Subsequently, in S1625, it is determined whether or not the elapsed time calculated using the time stamp is within the minimum guaranteed frequency. If the elapsed time is within the minimum guaranteed frequency, the process proceeds to S1630, and the received data is stored in the data storing unit 51 at predetermined position number. Subsequently, the process ends.

If it is determined that the priority received in S1615 is low and it is not within the minimum guaranteed frequency in S1625, the process proceeds to S1635, and it is determined whether or not the data storing unit 51 stores data to be picked up. If there is no data to be picked up in the data storing unit 51, the process proceeds to S1640, and the received data is stored in the data storing unit 51 in the tail end of data that has been already stored. Subsequently, the process ends.

In S1635, next data (#+1) is picked up from the data storing unit 51. After picking up the data, the process returns to S1610, and the similar step is performed comparing the priority of the next data with the priority of the received data.

A process that detects the conference situation just after receiving the data and determines the priority is described below in detail with reference to a specific case. A case that the pointing data is prioritized over transferring the image data is described below. FIG. 17 is a diagram illustrating received data. FIG. 18 is a diagram illustrating a third data group stored in the data storing unit 51. FIG. 19 is a diagram illustrating third history data stored in the data history storing unit 54.

In this case, the pointing data is received. The image data #1 in FIG. 18 is picked up from the data storing unit 51. Regarding the priorities of the received data and the retrieved data, in the data priority table shown in FIG. 10, priority 1 is the pointing data, and priority 4 is the image data. That is, the priority of the pointing data is higher than the image data.

Here, the history data in FIG. 19 indicates that the image data was transferred at 12:00:00.100 on Oct. 8, 2013. As shown in FIG. 18, the time stamp of the image data to be transferred is 12:00:00.300 on Oct. 8, 2013, and 200 milliseconds have elapsed since transferring data last time. With reference to FIG. 10, the minimum guaranteed frequency of the image data is 300 milliseconds, and it is desired to guarantee to transfer data once within 300 milliseconds. In this case, since there is some time until the minimum guaranteed frequency expires, it is controlled that the pointing data with higher priority than the image data is to be transferred.

FIG. 20 is a diagram illustrating a data structure of data stored in the data storing unit 51 after comparing data in this embodiment. Since the pointing data is transferred preferentially, the pointing data is stored at the position #1 whose transferring priority is the highest. The data transmitter 52 retrieves the top data stored in the data storing unit 51, i.e., the pointing data, and transfers it.

In the case described above, there is some time until the minimum guaranteed frequency expires. A case that the minimum guaranteed frequency expires is described below. FIG. 21 is a diagram illustrating received data. FIG. 22 is a diagram illustrating a fourth data group stored in the data storing unit 51. FIG. 23 is a diagram illustrating a fourth history data stored in the data history storing unit 54.

In this case, the pointing data is received too. The image data #1 in FIG. 22 is picked up from the data storing unit 51. Regarding the priorities of the received data and the retrieved data, in the data priority table shown in FIG. 10, priority 1 is the pointing data, and priority 4 is the image data. That is, the priority of the pointing data is higher than the image data.

Here, the history data in FIG. 23 indicates that the image data was transferred at 12:00:00.100 on Oct. 8, 2013. As shown in FIG. 22, the time stamp of the image data to be transferred is 12:00:00.500 on Oct. 8, 2013, and 400 milliseconds have elapsed since transferring data last time. Since the minimum guaranteed frequency of the image data is 300 milliseconds and it is desired to guarantee to transfer the data once within 300 milliseconds, the image data is transferred, and the pointing data is not transferred preferentially.

FIG. 24 is a diagram illustrating a data structure of data stored in the data storing unit 51 after comparing data in this embodiment. Since the image data is transferred preferentially, the image data is stored at the position #1 whose transferring priority is the highest. Since there is a grace period of 300 milliseconds after transferring the image data once, the pointing data is stored at the position #2, and the image data that used to be at position #2 is stored at the position #3. The data transmitter 52 retrieves the top data stored in the data storing unit 51, i.e., the image data, and transfers it.

As described above, even if the data whose priority is high is transferred consecutively and it is kept interrupting, it is possible to transfer data whose priority is low at a certain interval. Consequently, since not only the pointing data whose priority is high is transferred but also audio data and video data are transferred appropriately, it is possible to prevent sound and video from breaking. As a result, it is possible to communicate without any problem and maintain smooth communication.

It should be noted that the present invention can be applied to systems other than a conference system.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present invention also encompasses a non-transitory recording medium storing a program that executes a communication control method for an information processing apparatus. The communication control method, performed by the information processing apparatus, includes the steps of receiving data from one or more apparatuses in the information processing system, determining a transfer priority of the data received based on data type, transferring the data to apparatuses other than the apparatus that transferred the data in accordance with the transfer priority, determining if there is any data that has not been transferred during a predetermined data transfer period, and based on determination indicating that there is data that has not been transferred, modifying the transfer priority of data that has not been transferred to have a transfer priority higher than that of data to be transferred to next, and transferring the data having the modified transfer priority preferentially to apparatuses other than the apparatus that transferred the data.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. An information processing apparatus, comprising:
 a data receiver that receives first data from an apparatus;
 a user interface configured to
  display a screen image; and
  receive second data, the second data being stroke data that is input upon the screen image by a user of the user interface;
 a data transmitter that
  transmits the screen image to one or more apparatuses, including the apparatus from which the data receiver received the first data; and
  transmits the first data and the second data to the one or more apparatuses, in accordance with a transfer priority of the first data and the second data; and
 processing circuitry configured to
  determine the transfer priority according to a data type of the first data and the second data and a source of the first data and the second data, wherein the processing circuitry grants the second data received via the user interface a higher priority than the first data received via the data receiver;
  determine, after expiration of a predetermined data transfer period, whether data to be transferred during the predetermined data transfer period was not transferred during the predetermined data transfer period;
  modify, when the data was not transferred during the predetermined data transfer period, the transfer priority of the data to be a higher priority than that of other data to be transferred next; and
  control the data transmitter to transfer the data having the modified transfer priority preferentially to the one or more apparatuses.

2. The information processing apparatus according to claim 1, further comprising:
 an information storage configured to store data priority information that associates the data type with the transfer priority of the data, wherein
 the processing circuitry determines the transfer priority with reference to the data priority information.

3. The information processing apparatus according to claim 1, further comprising:
 a history storage configured to store information, relating to data transferred by the data transmitter, as history information, wherein
 the processing circuitry determines, whether the data to be transferred during the predetermined data transfer period was not transferred during the predetermined data transfer period, according to the history information.

4. The information processing apparatus according to claim 1, wherein the predetermined data transfer period is specified in accordance with the data type.

5. The information processing apparatus according to claim 1, further comprising:
 a data storage configured to store data that the data receiver receives, wherein
 the processing circuitry is further configured to retrieve the data stored in the data storage, determine the transfer priority of the data, store the data while rearranging the data in accordance with the determined transfer priority, retrieve data to be arranged in accordance with the transfer priority from the data storage, and pass the retrieved data to the data transmitter.

6. The information processing apparatus according to claim 1, further comprising:
 a data storage configured to store data received by the data receiver in accordance with the transfer priority determined by the processing circuitry; wherein
 the data transmitter retrieves and transfers data to be arranged in accordance with the transfer priority from the data storage.

7. The information processing apparatus according to claim 1, wherein the processing circuitry determines the transfer priority in response to data reception by the data receiver or data transmission by the data transmitter and determines whether or not the data that has not been transferred is within the predetermined data transfer period.

8. The information processing apparatus according to claim 1, wherein the first data is image data, sound data, video data, pointing data or stroke data.

9. An information processing system, comprising:
 a plurality of apparatuses; and
 an information processing apparatus configured to control communication among the plurality of apparatuses, the information processing apparatus comprising:
  a data receiver that receives first data from an apparatus of the plurality of apparatuses;
  a user interface configured to
   display a screen image; and receive second data, the second data being stroke data that is input upon the screen image by a user of the user interface;

a data transmitter that
transmits the screen image to one or more apparatuses, including the apparatus from which the data receiver received the first data; and
transmits the first data and the second data to the one or more apparatuses, in accordance with a transfer priority of the first data and the second data; and processing circuitry configured to
determine the transfer priority according to a data type of the first data and the second data and a source of the first data and the second data, wherein the processing circuitry grants the second data received via the user interface a higher priority than the first data received via the data receiver;
determine, after expiration of a predetermined data transfer period, whether data to be transferred during the predetermined data transfer period was not transferred during the predetermined data transfer period;
modify, when the data was not transferred during the predetermined data transfer period, the transfer priority of the data to be a higher priority than that of other data to be transferred next; and
control the data transmitter to transfer the data having the modified transfer priority preferentially to the one or more apparatuses.

10. A method of controlling communication in an information processing system, the method comprising:

receiving, by an information processing apparatus, first data from an apparatus in the information processing system;
displaying, by a user interface of the information processing apparatus, a screen image;
receiving, by the user interface, second data that is stroke data input upon the screen image by a user of the user interface;
determining, by processing circuitry of the information processing apparatus, a transfer priority according to a data type of the first data and the second data and a source of the first data and the second data, wherein the processing circuitry grants the second data received via the user interface a higher priority than the first data received via the data receiver;
transferring the screen image to one or more apparatuses, including the apparatus from which the first data is received;
transferring the first data, and the second data to the one or more apparatuses in accordance with the transfer priority of the first data and the second data;
determining, after expiration of a predetermined data transfer period, whether data to be transferred during the predetermined data transfer period was not transferred during the predetermined data transfer period;
modifying, the processing circuitry when the data was not transferred during the predetermined data transfer period, the transfer priority of the data to be a higher priority than that of other data to be transferred to next; and
transferring the data having the modified transfer priority preferentially to the one or more apparatuses.

* * * * *